(12) United States Patent
Suzuki

(10) Patent No.: US 7,625,527 B2
(45) Date of Patent: Dec. 1, 2009

(54) CARBON BLACK REACTOR

(75) Inventor: Osamu Suzuki, Niigata (JP)

(73) Assignee: Asahi Carbon Co., Ltd., Niigata (JP)

( * ) Notice: Subject to any disclaimer, the term of this patent is extended or adjusted under 35 U.S.C. 154(b) by 297 days.

(21) Appl. No.: 10/480,415

(22) PCT Filed: Apr. 30, 2002

(86) PCT No.: PCT/JP02/04316

§ 371 (c)(1),
(2), (4) Date: Dec. 11, 2003

(87) PCT Pub. No.: WO03/000804

PCT Pub. Date: Jan. 3, 2003

(65) Prior Publication Data

US 2005/0089454 A1   Apr. 28, 2005

(30) Foreign Application Priority Data

Jun. 22, 2001   (JP) .............................. 2001-190409

(51) Int. Cl.
C09C 1/48   (2006.01)

(52) U.S. Cl. ....................... 422/150; 422/151; 422/156; 422/158; 423/449.1

(58) Field of Classification Search ................. 422/150, 422/151; 423/456, 457
See application file for complete search history.

(56) References Cited

U.S. PATENT DOCUMENTS

| | | | | |
|---|---|---|---|---|
| 3,984,528 A | * | 10/1976 | Cheng et al. | ................. 423/450 |
| 4,447,401 A | * | 5/1984 | Casperson et al. | ........... 422/151 |
| 4,927,607 A | * | 5/1990 | Berg et al. | .................. 422/150 |
| 5,254,325 A | * | 10/1993 | Yamasaki et al. | ............ 423/450 |
| 5,264,199 A | * | 11/1993 | Sakaue et al. | ............. 423/449.1 |

FOREIGN PATENT DOCUMENTS

| | | |
|---|---|---|
| GB | 1304390 A | 1/1973 |
| GB | 2003457 A | 3/1979 |

* cited by examiner

*Primary Examiner*—Jennifer A Leung
(74) *Attorney, Agent, or Firm*—Oliff & Berridge, PLC

(57) ABSTRACT

This invention relates to a carbon black reactor comprising; a combustion zone for generating a hot combustion gas by burning a mixture of a hydrocarbon fuel and an oxygen containing gas, a reaction zone for producing a carbon black by contacting the hot combustion gas with a feedstock introduced in a plurality of divided flows to thermally decompose and/or incompletely combust the feedstock, and a quench zone for stopping a carbon black growth reaction by injection a coolant to said carbon black containing flow, and these three zones are arrayed laterally in order, wherein the cross-section shape of the feedstock introduction part in the reaction zone is not a circle nor a polygon. The carbon black reactor can produce the carbon black having same characteristics, especially the distribution of the aggregate size, as one produced by pilot-scale reactor, while its production scale is increased to the level of that of reactor actually operated.

12 Claims, 6 Drawing Sheets

(a)

(b)

CARBON BLACK REACTOR

TECHNICAL FIELD

This invention relates to a carbon black reactor, and more particularly to a carbon black reactor having the feedstock introduction part of a novel cross-section shape for modifying the manner of a contact between a hot combustion gas and a feedstock to produce a carbon black in large output without any sacrifice of carbon black characteristics, especially a distribution of an aggregate size (a minimum dispersion unit into a rubber matrix) measured by centrifugal sedimentation analysis.

BACKGROUND ART

Carbon blacks are generally produced in Furnace process. In this process, at first, a hydrocarbon fuel is burned with an excess amount of oxygen typically supplied as a flow of air or oxygen containing gas in the space having a lining of fire resistant material to produce a hot combustion gas. Then, a high molecular weight hydrocarbon oil as feedstock is injected in a plurality of streams to the hot combustion gas, and the feedstock is thermally decomposed and dehydrogenated to prepare an aerosol which contains carbon black particles suspended in the gas. Finally, the carbon black particles are separated from the gas and collected. The resultant carbon black collected as a fluffy powder can be pelletized by means of conventional pelletizing methods.

Since the carbon blacks of various characteristics and grades can be produced by adjusting various operating condition, for example, an amount and a position of the introduction of a fuel; an amount, a position and a manner of a introduction of feedstock and oxygen containing gas; a position of quenching; a diameter of reactor and so on, most of carbon black is produced in this process at the present.

Carbon blacks are produced in large quantities throughout the world and commonly used as reinforcing filler for an elastomer and as pigment or colorant for a plastic, a paint and a printing ink. The largest application field of a carbon black is a manufacture of pneumatic tires for automotive and aircraft, wherein the carbon black is used as reinforcing filler for a rubber matrix to impart mechanical strength and wear resistance to it.

Recently, the problems from environmental and/or safety aspects are emphasized in the tire industry, and a further demand for lower fuel consumption, longer service life and improved grip performance are intensified. Although a rubber itself must be improved, a carbon black is also requested to improve for such demands. That is, a carbon black is required to control not only conventional macroscopic properties, such as a specific surface area and a structure, but also microscope properties, such as a particle size, an aggregate size and distributions of them. Therefore, it becomes important to develop the carbon black reactor which can easily control these microscopic properties. In addition, there is need for carbon black reactor which can increase the output of the carbon black, and which can effectively utilize the thermal energy of the hot combustion gas.

In order to solve the above-mentioned problems, many techniques and patents relating to the geometry and the operating condition of a carbon black reactor have bean disclosed.

As mentioned above, since a carbon black is produced by injecting the feedstock into the hot combustion gas occurred from burning the hydrocarbon fuel with the oxygen containing gas, and thermally decomposing and/or incompletely combusting the feedstock, the manner of contact of the hot combustion gas and the feedstock has much influence upon the physical or chemical characteristics of the carbon black, especially the properties of the aggregate, unit particle size which said aggregate is composed, and the distribution of said size. Therefore, there is prior art that the contact condition is altered to improve the characteristics of the carbon black. For example, it is disclosed that the contact condition is changed by introducing the carbon black separately produced in different contact condition to the feedstock introducing chamber to widen the distribution of the aggregate size (For example, Japanese patent publication No. Hei64-4659, Applicant: Tokai Carbon Co., Ltd).

In other prior art, to achieve the high efficiency for the use of heat energy, the facility for scale up, the high output of product, and the ability to produce high quality product, the feedstock is introduced into the hot combustion gas in the form of a plurality of individual coherent streams substantially from the exterior periphery and a plurality of individual coherent streams outwardly, substantially transversely from at least one location in the interior (U.S. Pat. No. 3,922,335, Assignee: Cabot Corporation).

In another example, the reaction chamber of the carbon black reactor was defined by a plurality of flat planes so that the cross-section shape of the flow of the hot combustion gas substantially conforms to the spray pattern of the feedstock, thereby providing a minimum flame length within the reactor and more efficient use of the hot combustion gas (U.S. Pat. No. 5,256,388, Assignee: Colombian Chemicals Company).

In the meantime, considering the temperature and the flow velocity of the hot combustion gas at the position where the feedstock is introduced (the flow velocity may be extremely high such as approximate sound velocity), when the feedstock is introduced to the hot combustion gas, especially in the atomized form, the feedstock would be flowed by the flow of the hot combustion gas toward a downstream. In case that the space where feedstock is introduced is narrow, however, contact efficiency of the hot combustion gas and the feedstock is high because most of the cross-section of the feedstock introduction part is covered with the feedstock (FIG. 8).

On the other hand, when a cross-section of the feedstock introduction part is widened in order to increase a amount of the feedstock introduced, which in turn leads to increase a output of a carbon black, the hot combustion gas which does not contact with the feedstock and passes toward the downstream is increased especially at the central region of said part (FIG. 9).

As compared with FIG. 8 and FIG. 9, it is clearly understood that the contact efficiency between the hot combustion gas and the feedstock in the carbon black reactor having enlarged feedstock introduction part is considerably lower than that in the reactor having narrow feedstock introduction part.

This is a reason why there is the difference in the carbon black characteristics, such as the distributions of unit particle size and the aggregate size between the pilot-scale reactor, which has a narrow feedstock introduction part, and the reactor actually operated. That is, in the pilot-scale reactor, the both distributions are narrow, whereas in the reactor actually operated, said distributions are wider than the former.

As mentioned above, when a carbon black is produced in the reactor actually operated, it is very difficult to obtain the product having the characteristics of one produced in the pilot-scale plant. Accordingly, if narrow distribution of the unit constituent particle size and the aggregate size is required for the carbon black, use of many pilot-scale reactors at the same is an only measure to produce it having such characteristics in the large scale.

SUMMARY

The purpose of the present invention is to solve the scanty output of a carbon black, which is the largest defect of the production in the pilot-scale reactor, while the contact efficiency between the hot combustion gas and the feedstock is maintained high.

Therefore, first subject of the present invention is to provide a novel carbon black reactor which increases the contact efficiency between the hot combustion gas and the feedstock to improve the conversion rate from the feedstock to the carbon black. Second subject of the present invention is to provide a novel carbon black reactor which produces a carbon black characterized that the distribution of an aggregate, which is the smallest dispersion unit to a rubber matrix, is narrower than a common product in a large scale production at a low cost.

In order to solve these subjects, the inventor tries to alter the cross-section shape of the feedstock introducing chamber to various shapes, and finally found a suitable shape for production of the carbon black having desired characteristics.

That is, the present invention refers to a carbon black reactor comprising;
a combustion zone for generating a hot combustion gas by burning a mixture of a hydrocarbon fuel and an oxygen containing gas,
a reaction zone for producing a carbon black by contacting said hot combustion gas with a feedstock introduced in a plurality of divided flows to thermally decompose and/or incompletely combust the feedstock, and
a quench zone for stopping a carbon black growth reaction by injecting a coolant (ordinarily water) to said carbon black containing flow, and
these three zones are arrayed laterally in order, wherein the cross-section shape of the feedstock introduction part in said reaction zone is not a circle nor a polygon.

In the present invention, the cross-section shape of the reaction chamber, especially at feedstock introduction part, is not a circle nor a polygon, in addition, there is a difference in length between the longest axis and the shortest axis. At feedstock introduction part, feedstock atomizing means are arranged at proper locations so as not to make any space in which a hot combustion gas does not contact with the feedstock streams and passes to the downstream, particularly in a central region of the reaction zone. Thus, a contact efficiency between the hot combustion gas and the feedstock is increased to improve a conversion ratio from the feedstock to the carbon black.

The cross-section shape of the feedstock introduction part is neither a circle nor a polygon. Preferably, a ratio of a longest axis (major axis) of said cross-section shape to a shortest axis (minor axis) thereof ranges from 1.5 to 20, particularly more from 2 to 10.

As long as above requirements are satisfied, there is no restriction for said cross-section shape. Said cross-section shape is formed of a combination of curved lines and curved lines such as semicircle or circle segment and ellipse, or semicircle or circle segment and open curve, or a combination of curved lines and straight lines such as semicircle and straight line (torus), circle segment and straight line, or ellipses segment and straight line. Herein, the curved line includes closed curves such as a circle or an ellipse, or open curves such as a cycloid, an involute, a parabola and a hyperbola. The segments of these can also be applied to a part of said cross-section shape. However, ellipse can be applied to said cross-section shape as it is. In the case that a segment of circles and/or ellipses is applied to the cross-section shape, its center angle made by a center of the circle or the ellipse and two ends of the segment is 180° or less.

As for example of said cross-section shape, it is mentioned that the shape formed of the combination of two semicircles and two straight lines as shown in FIG. 2, i.e. torus, the shape formed of the combination of two circle segments and two straight lines as shown in FIG. 4, or the shape formed of the combinations of two circle segments and two ellipse segments as shown in FIG. 5.

THE BRIEF DESCRIPTION OF DRAWINGS

BEST MODE FOR CARRYING OUT THE INVENTION

In the following, the detail of the present invention will be explained with reference to the figures enclosed.

Figure 1:
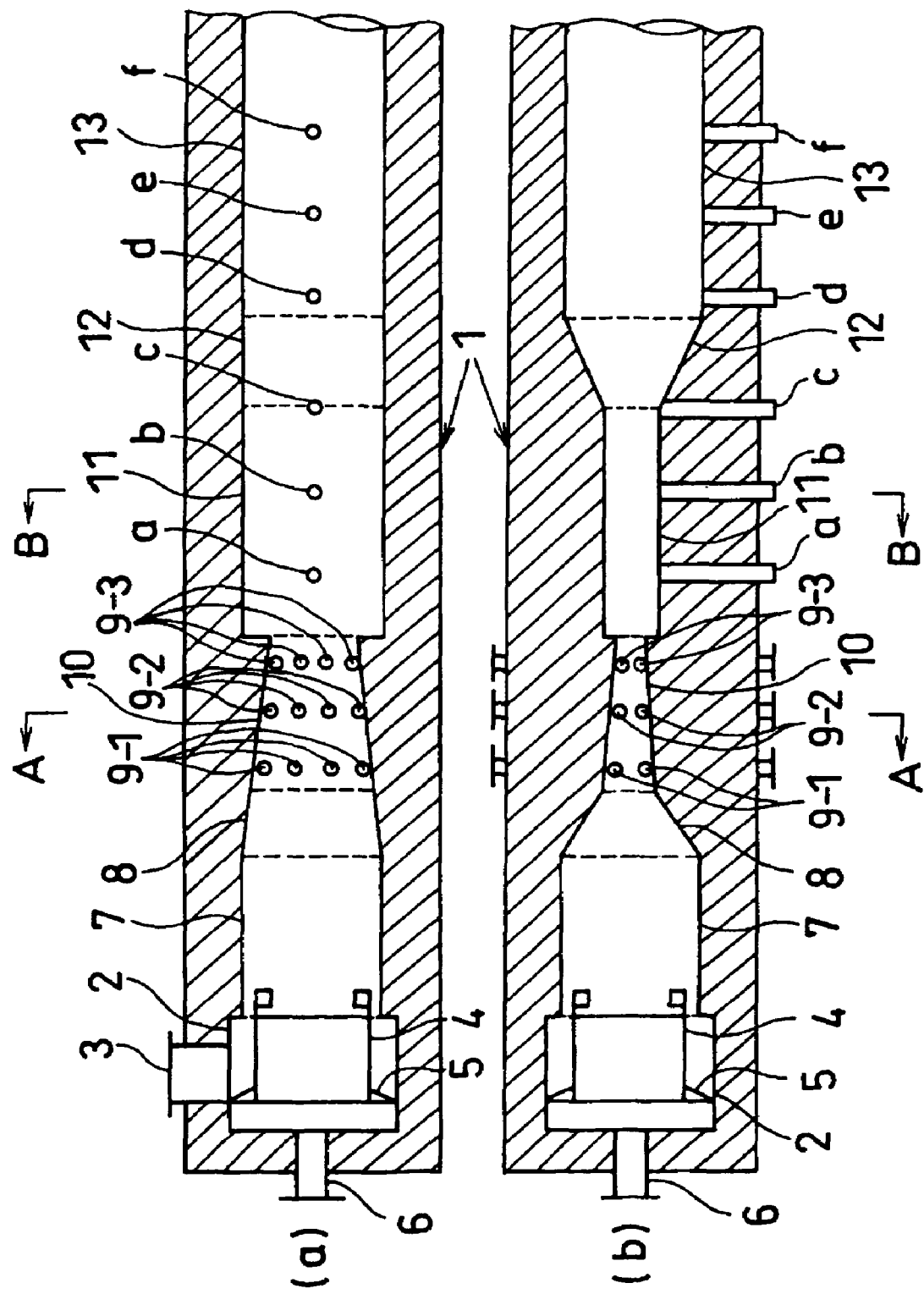
FIG. 1 is a schematic drawing of the carbon black reactor of the present invention in (a) vertical and (b) horizontal cross-section along with longitudinal axis.
Figure 2:
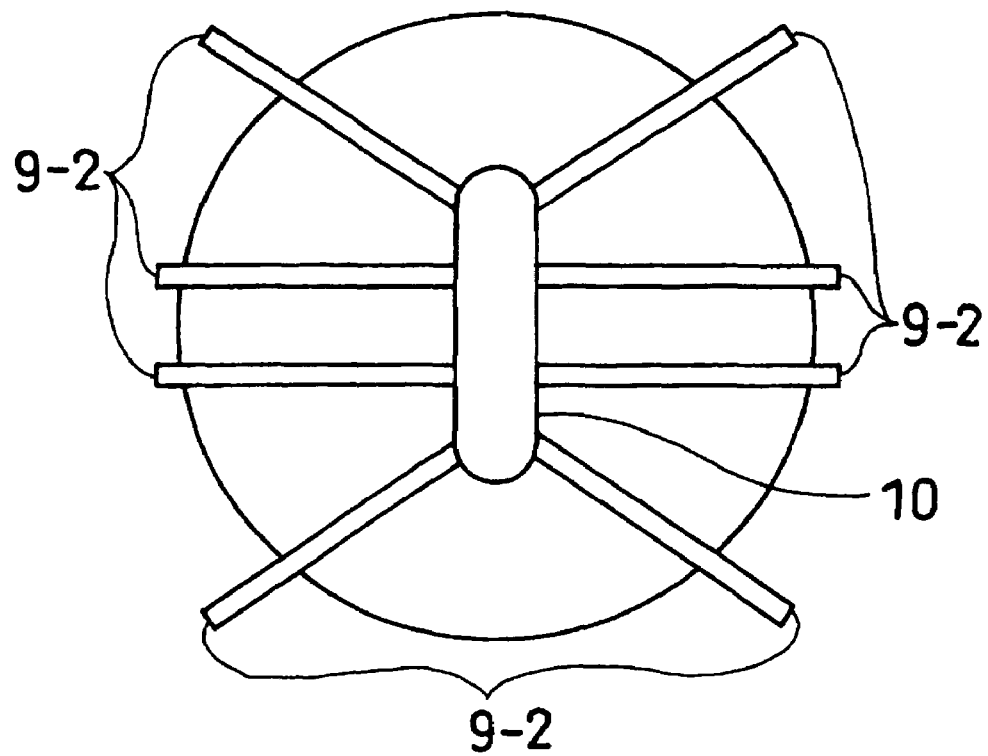
FIG. 2 is a cross-section drawing taken through section line A-A in FIG. 1.

Referring to FIGS. 1 and 2, the carbon black reactor 1 has a combustion zone consisting of the hydrocarbon fuel introduction chamber 2, the oxygen containing gas introduction conduit 3, the oxygen containing gas conduit 4, the current plates 5, the combustion chamber 7 and the intermediate conversion chamber 8; a reaction zone consisting of on the reaction chamber 10; and a quench zone consisting of the reaction continuation and quench chambers 11, 12 and 13.

There is the introduction chamber 2 at the upstream end of the carbon black reactor 1, and the introduction conduit 3 is provided to the outside of the introduction chamber 2. In the introduction chamber 2, the conduit 4 which has a cylindrical geometry is provided concentrically. The conduit 4 has a diameter smaller and a length shorter than the introduction chamber 2, and the downstream thereof is constant with the introduction chamber 2. At the outer periphery of the conduit 4, the current plates 5 are provided to rectify the flow of oxygen containing gas. Preferably, the current plates 5 are installed by equal degree and suitable number of them are from 10 to 20. Along with the central axis of the introduction chamber 2 and the conduit 4, the fuel introduction tube (not shown) is provided through the space 6. To the downstream of the introduction chamber 2, the combustion chamber 7 of a cylindrical geometry is connected concentrically, the diameter of the combustion chamber 7 being same as or a little smaller than that of introduction chamber 2.

As shown in FIGS. 1 and 2, the intermediate conversion chamber 8 is connected to the downstream of the combustion chamber 7. The cross-section shape of the conversion chamber 8 changes from the circle to the torus little by little to prevent sudden change of the shape in horizontal (lateral) direction. To the downstream of the conversion chamber 8, the reaction chamber 10 of the toric cross-section shape is connected, and the plurality of feedstock atomizing means 9 are provided on the reaction chamber 10. As shown in a vertical section of FIG. 1(a), both the conversion chamber 8 and the introduction chamber 10 have a continuously converged geometry, and the convergence angle is 2-20°, preferably 3-10° against the central axis The atomizing means 9 are arranged at three feedstock introduction parts 9-1, 9-2 and 9-3 in the reaction chamber 10, and there are eight atomizing means 9 in each part. The number of the atomizing means 9 and the part arranged the atomizing means 9, and the position of the part to be used are selected suitably depending on quality and grade of the carbon black intended to obtain.

To the downstream of the reaction chamber 10, there is the reaction continuation and quench chambers 11, 12 and 13, which volumes are larger than that of the reaction chamber 10, and which are provided the plurality of the coolant (water) introduction means (a-f) for quenching the carbon black containing gas to stop a carbon black growing reaction. The cross-section shape of said chambers are changed at will. In this embodiment, however, the cross-section shape of chamber 11 has a similar figure with that of the reaction chamber 10 on the downstream side, i.e. a torus, to keep the degree of the turbulence of the carbon black containing gas constant in the chamber 11. The chamber 11 is connected to the chamber 12, which cross-section shape is changed from a torus to a circle little by little. Next, the chamber 12 is connected to the chamber 13 having circular cross-section shape, i.e. a cylindrical geometry.

For example, the cross-section shapes of the intermediate conversion chamber 8 and the reaction chamber 10 shown in FIG. 1(a) are as follows.

Intermediate Conversion Chamber 8
The upstream end corresponds to the downstream end of the combustion chamber 7, and which cross-section shape is a circle. The downstream end corresponds to the upstream end of the reaction chamber 10, and which cross-section shape is a torus.

Reaction Chamber 10
The upstream end corresponds to the downstream end of the intermediate conversion chamber 8, which cross-section shape is a torus. It converges in the similar figure toward the downstream, and the convergence angle is same as that of the convergence in the intermediate conversion chamber 8 to the feedstock introduction chamber 10 in FIG. 1(a).

EXAMPLE 1

Figure 3:
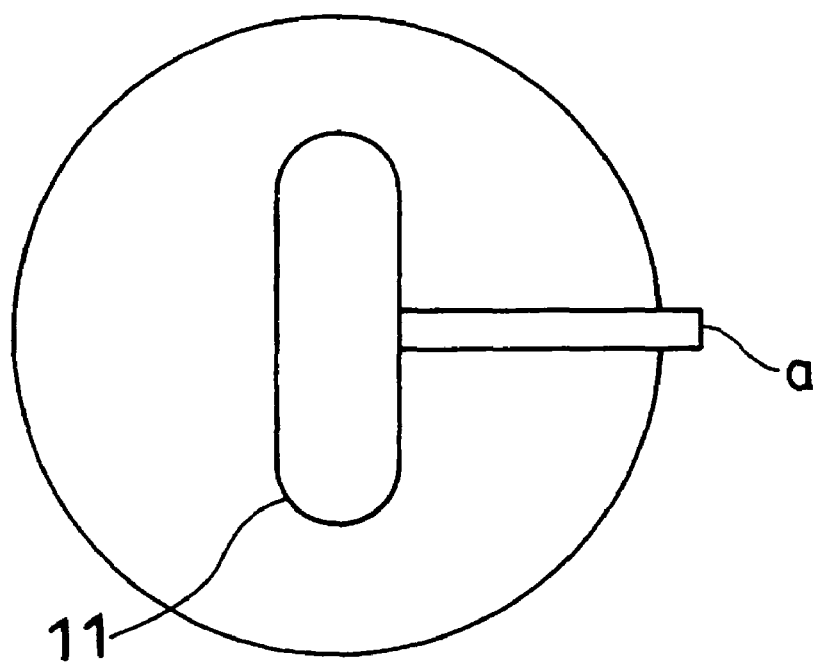
FIG. 3 is a cross-section drawing taken through section line B-B in FIG. 1.
Figure 4:
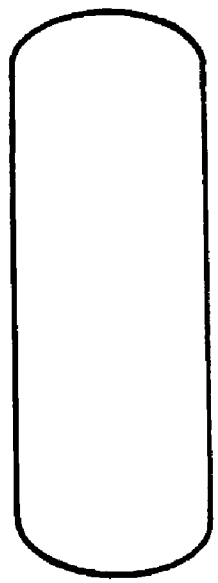
FIG. 4 is a schematic drawing of another cross-section shape of a feedstock introduction part formed of the combination of two circle segments and two straight lines.
Figure 5:
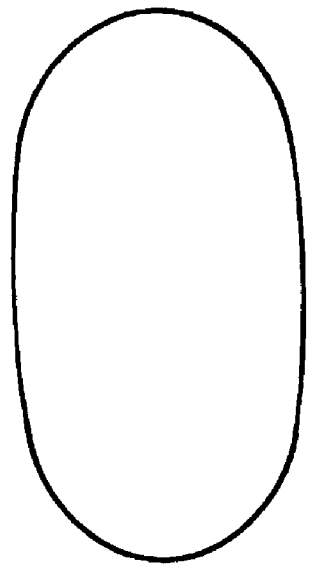
FIG. 5 is a schematic drawing of another cross-section shape of a feedstock introduction part formed of the combination of two circle segments and two ellipse segments.

A SAF carbon black was produced by using the carbon black reactor having structure as shown in FIGS. 1, 2 and 3. The dimensions of the each element in the reactor were as follows. In the case where the cross-section shape of the element is a torus, the dimensions of it is shown in the length of the major axis (longest length, x) and the length minor axis (shortest length, y).

Hydrocarbon Fuel Introduction Chamber 2
   Inside diameter: 650 mm
   Length: 600 mm
Oxygen Containing Gas Introduction Conduit 3
   Long side: 400 mm
   Short side: 200 mm
Oxygen Containing Gas Conduit 4
   Inside diameter: 450 mm
   Length: 500 mm
Combustion Chamber 7
   Inside diameter: 595 mm
   Length: 1000 mm
Intermediate Conversion Chamber 8
   Cross-section shape at upstream end: circle, 595 mm
   Cross-section shape at downstream end: torus, x=472 mm, y=241 mm
   Length: 500 mm
   Convergence angle in the vertical direction: 7°
   Convergence angle in the horizontal direction: 19.5°
Reaction Chamber 10
   Cross-section shape at upstream end: shape same as downstream end of the intermediate conversion chamber 8
   Cross-section shape at downstream end: torus, x=300 mm, y=70 mm
   Length: 700 mm
   Convergence angle: 7°
Reaction Continuation and Quench Chamber 11
   Cross-section shape: torus, x=370 mm, y=140 mm
   Length: 1000 mm
Reaction Continuation and Quench Chamber 12
   Cross-section shape at upstream end: shape same as the downstream end of the reaction continuation chamber 11
   Cross-section shape at downstream end: circle, 370 mm
   Length: 500 mm
   Horizontal extension angle: 13°
Reaction Continuation and Quench Chamber 13
   Inside diameter: 370 mm
Feedstock Introduction Part 9-1
   300 mm upstream from downstream end of the reaction chamber 10
   Cross-section shape: torus, x=374 mm, y=144 mm
   Length ratio (x/y): 2.60
   Number of feedstock atomizing means: 8
   (Only 9-1 was used among three feedstock introduction parts of 9-1, 9-2 and 9-3.)
Coolant (Water) Injectors a-f
They were provided in the reaction continuation and quenching chambers 11, 12 and 13, and constituted according to Japanese Utility Model Publication No. Sho 58-140147 (applicant: Asahi Carbon Co., Ltd.).

As for both the hydrocarbon fuel and the feedstock, the material having the compositions and the physical properties shown in table 1 was used.

TABLE 1

| Combustible fluid and feedstock properties | |
|---|---|
| Specific gravity (JIS K2249) (15/4° C.) | 1.1319 |
| Kinematical viscosity (JIS K2283) (cSt at 50° C.) | 26.7 |
| Water (JIS K2275) (%) | 0.5 |
| Residual carbon (JIS K2270) (%) | 11.6 |
| Sulfur content (JIS K2273) (%) | 0.4 |
| Carbon (%) | 90.1 |
| Hydrogen (%) | 5.4 |
| Distillation properties | |
| Initial Boiling point (° C.) | 188 |
| 10% Boiling point (° C.) | 234 |

TABLE 1-continued

| Combustible fluid and feedstock properties | |
|---|---|
| 50% Boiling point (° C.) | 360 |
| BMCI | 160 |

EXAMPLE 2

A SAF carbon black was produced by using same reactor as Example 1 except that different feedstock introduction part was used.

Feedstock Introduction Part 9-3
    100 mm upstream from down stream end of the reaction chamber 10
    Cross-section shape: torus, x=327 mm, y=95 mm
    Length ratio (x/y): 3.42
    Number of feedstock atomizing means: 8

COMPARATIVE EXAMPLE 1

Figure 6:
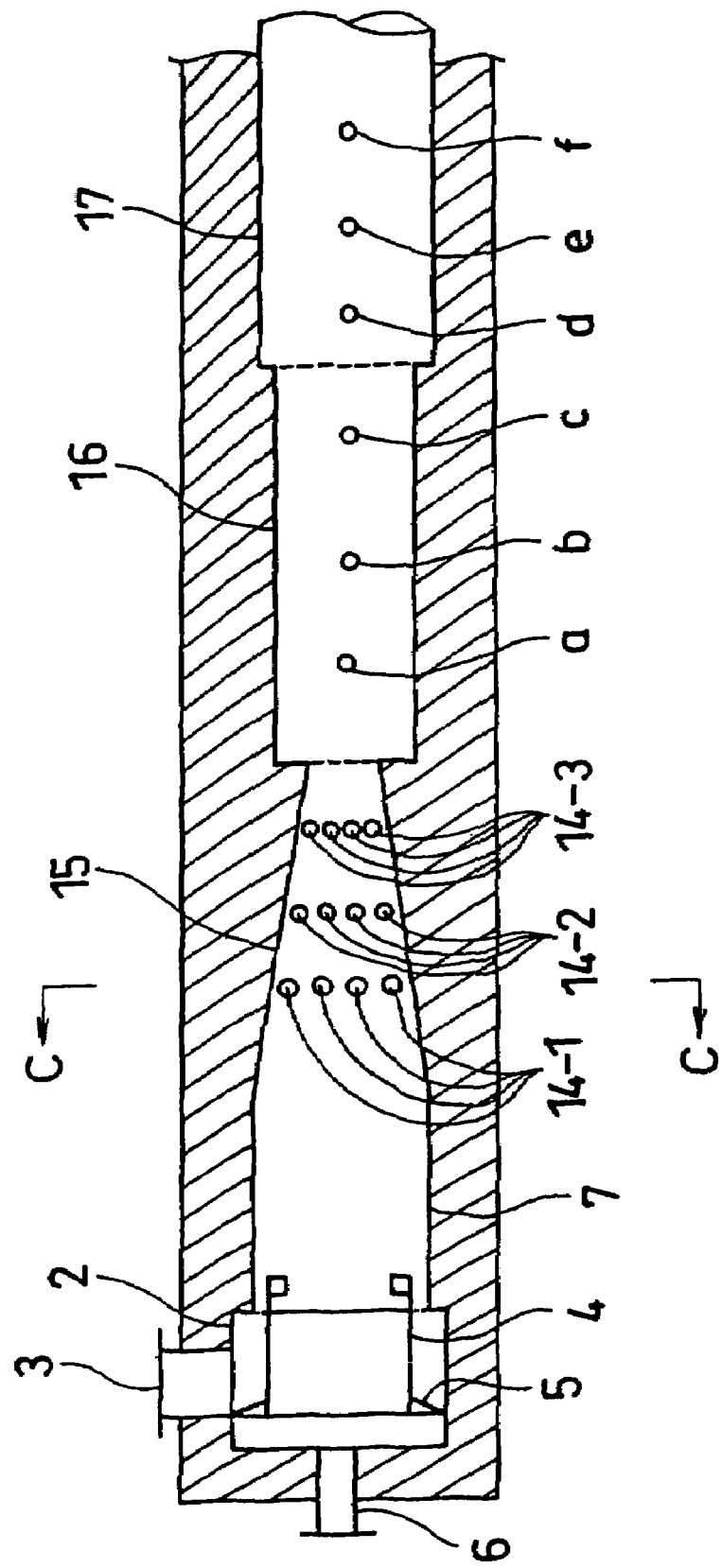
FIG. 6 is a schematic drawing of the carbon black reactor of the prior art in vertical cross-section along with longitudinal axis.
Figure 7:
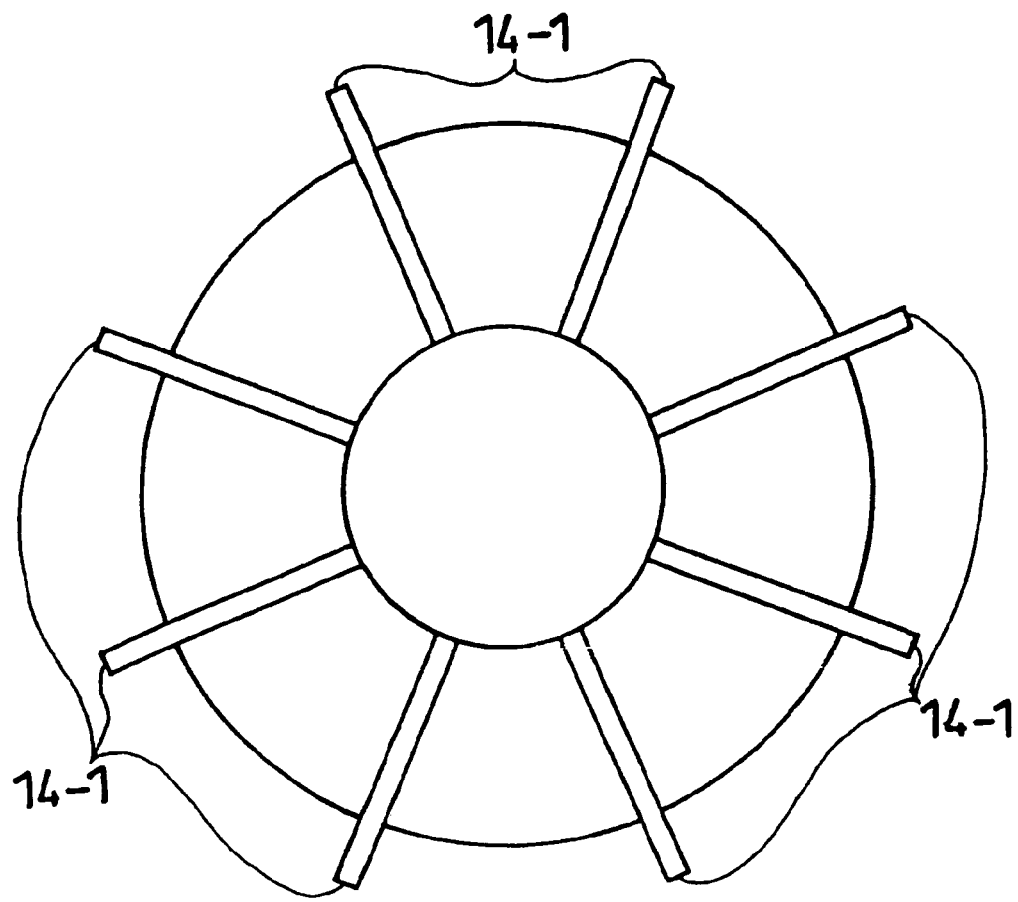
FIG. 7 is a cross-section drawing taken through section line C-C in FIG. 6.
Figure 8:
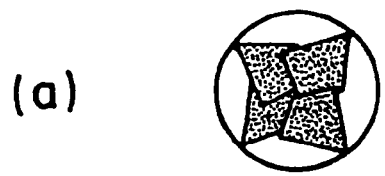
FIG. 8 is a schematic drawing of the cross-section of a feedstock inducing part in the case where it is narrow, for explaining a contact efficiency between a hot combustion gas flow and a feedstock. (a) is a cross-section drawing perpendicular to a flow direction, and (b) is a cross-section drawing parallel to a flow direction.
Figure 8:
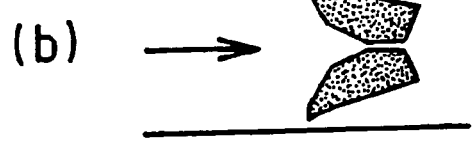
Figure 9:
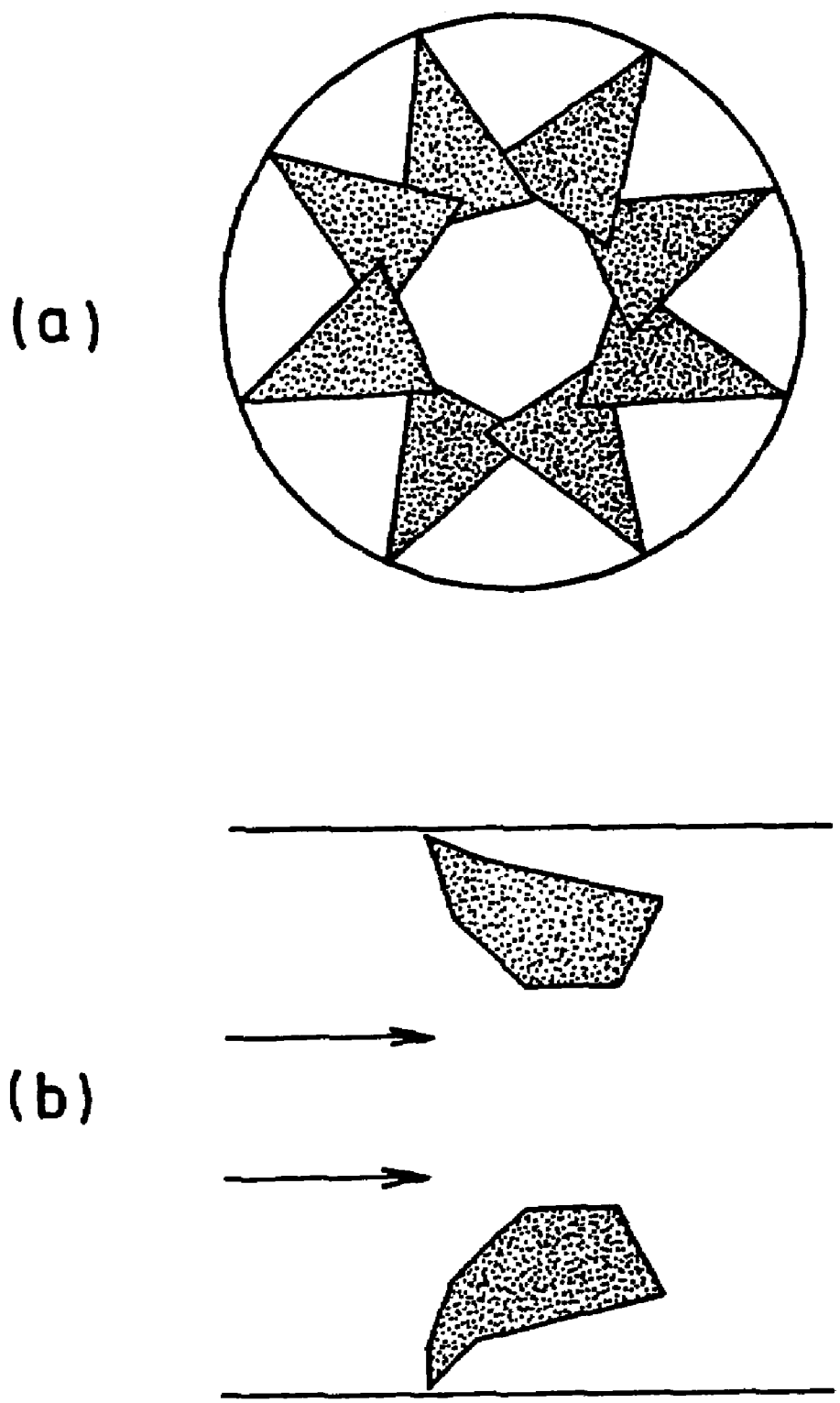
FIG. 9 is a schematic drawing of the cross-section of a feedstock inducing part in the case where it is wide, for explaining a contact efficiency between a hot combustion gas and a feedstock. (a) is a cross-section drawing perpendicular to a flow direction, and (b) is a cross-section drawing parallel to a flow direction.

A SAF carbon black was produced in the same manner as Example 1 except that conventional elements, which constituted of the cylindrical part and the restricting part, was used in place of the elements from the intermediate conversion chamber 8 to the reaction continuation and quench chamber 13. That is, the reaction chamber 15 was connected to the downstream end of the combustion chamber 7. Next, the reaction continuation and quench chamber 16 was connected to the downstream end of the reaction chamber 15. To the downstream end of it, the reaction continuation and quench chamber 17, which is similar to the quench chamber 13 shown in FIG. 1, was connected. This reactor had the vertical cross-section along with longitudinal axis as shown in FIG. 6, and the feedstock introduction part as shown in FIG. 7. In FIGS. 6 and 7, reference characters 14-1, 14-2 and 14-3 show feedstock introduction parts. The dimensions of the each element in the reactor are as follows.

Hydrocarbon fuel introduction chamber 2, Oxygen containing gas introduction conduit 3, Oxygen containing gas conduit 4, and Combustion chamber 7
    Same as Example 1

Reaction chamber 15
    Frusto-conical restriction division
    Cross-section of the upstream end: 595 mm
    Cross-section of the downstream end: 160 mm
    Length: 1700 mm
    Convergence angel: 7.3°
Reaction continuation and quench chamber 16
    Inside diameter: 230 mm
    Length: 1500 mm
Reaction continuation and quench chamber 17
    Same as Quench chamber 13 in Example 1
Feedstock introduction part
    300 mm upstream from down stream end of the reaction chamber 15
    Number of feedstock atomizing means: 8

A SAF carbon black was produced by the pilot-scale carbon black reactor which has same geometry as shown in FIG. 6, but whose amount of the feed-stock introduced is small. The dimensions of the each element in the reactor are as follows.

Hydrocarbon Fuel Introduction Chamber 2
    Inside diameter: 315 mm
    Length: 300 mm
Combustion Chamber 7
    Inside diameter: 305 mm
    Length: 300 mm
Reaction Chamber 15
    Frusto-conical restriction division
    Cross-section at the upstream end: 305 mm
    Cross-section at the downstream end: 70 mm
    Length: 1000 mm
    Convergence angel: 6.7°
Reaction Continuation and Quench Chamber 16
    Inside diameter: 100 mm
    Length: 1000 mm
Feedstock Introduction Part
    100 mm upstream from downstream end of the reaction chamber 15
    Number of feedstock atomizing means: 4

Producing condition of each Examples are shown in Table 2.

TABLE 2

| | Carbon black producing conditions | | | | |
|---|---|---|---|---|---|
| | Example 1 | Example 2 | Comparative example 1 | Comparative example 2 | Reference example 1 |
| Combustion Air (kg/hr) | 7000 | 7000 | 7000 | 7000 | 900 |
| Air preheat (° C.) | 600 | 600 | 600 | 600 | 500 |
| Fuel Rate (kg/hr) | 350 | 350 | 350 | 350 | 50 |
| Feedstock Rate (kg/hr) | 1330 | 1430 | 1250 | 1320 | 140 |
| Feedstock pressure (MPa) | 2.0 | 2.8 | 1.9 | 2.6 | 1.5 |
| Feedstock preheat (° C.) | 200 | 200 | 200 | 200 | 150 |
| Number of feedstock atomizing means | 8 | 8 | 8 | 8 | 4 |
| Introducing position[1] (mm) | 300 | 100 | 300 | 100 | 300 |
| Quenching position[2] (mm) | 2000 | 2000 | 2000 | 2000 | 1500 |
| Longest length/shortest length at the feedstock injected part | 2.60 | 3.42 | 1.0 | 1.0 | 1.0 |
| Output index[3] | 101 | 108 | 92 | 100 | 11 |

[1] distance of the narrowest point from upstream end.
[2] distance of the narrowest point from downstream end.
[3] The index which is compared with Comparative Example 2 is 100.

Physical and chemical properties of the carbon blacks so obtained were measured as follows.

(1) CTAB Surface Area

This value was measured according to the D method of JIS K 6217, 1997, section 8, and indicated as specific surface area (m²/g) per unit weight.

(2) CDBP (n-dibutylphthalate (DBP) Adsorption Number of Compressed Sample)

This value was measured according to the method described in JIS K 6217, 1997, section 10, and indicated as the volume of DBP absorbed (cm³) in 100 g of the carbon black.

(3) Analysis for the Aggregate Size of the Carbon Black Measured by the Centrifugal Sedimentation Method As a measuring device, the high-speed disk centrifugal ultra-fine particle size analyzer (device name: BI-DCP, supplied by BROOKHAVEN INSTRUMENTS CORPORATION) was used. A small amount of surfactant (Nonidet P40, CAS No.9036-19-5, supplied by Nacalai Tesque Inc.) was added to a carbon black which was dried according to JIS K 6218. The mixture was kneaded well to be paste, and mixed with 20 volume % ethanol aqueous solution to prepare dispersion having 200 mg/l of carbon black concentration. Then, the dispersion was treated with ultrasonic wave homogenizer to prepare the sample.

A rotational frequency of the measuring device was set at 8000 rpm. 10.0 ml of spin liquid (pure water, 24° C.), 1.0 ml of buffer liquid (20 volume % ethanol aqueous solution, 24° C.), and 0.5 ml of carbon black dispersing liquid (24° C.) were injected successively to the device, then measurement was started. The distribution carve was plotted with the lapse in course of time from the addition of the carbon black dispersing liquid against a absorbance obtained by this measurement, and the stokes correspondent diameters corresponding to each of times (t) were calculated by the equation (1);

$$D=\{[18\eta \ln(Rd/Ri)]/\omega 2\Delta\rho t\}^{1/2} \quad (1),$$

wherein, $\eta$ is the solvent viscosity (mPa·s), $\omega$ is the disk rotational frequency (rpm), $\Delta\rho$ is the difference of the density between the carbon black particle and the solvent (g/cm³), Rd is the radius of the measuring point of the absorbance from the center of the disk (cm), Ri is the radius of the injection point of the carbon black dispersion, and t is the time (minute).

Explaining the definition of half-value width ($\Delta D50$) of distribution curve and mode diameter (Dst)

Stokes correspondence diameter at the largest frequency value in distribution curve is defined as Dst mode diameter (nm). The difference in stokes correspondent diameter between 2 points which corresponds to 50% frequency of the largest frequency value (half-value width) is defined as $\Delta D50$ (nm).

Results are given in Table 3

Effects of the Invention

The carbon black produced by the carbon black reactor according to the present invention exhibits the same characteristics, especially the distribution of the aggregate size, as one produced by pilot-scale reactor, while its production scale is increased to the level of that of the reactor actually operated. If more increased output is desired, it is readily achieved by lengthening the long sides of the cross-section shape of the feedstock-introduction part with keeping the length of the short sides constant. Thus, the carbon black reactor according to the present invention can produce the high performance carbon black in large-scale at low cost.

The invention claimed is:

1. A carbon black reactor comprising:
   a combustion zone for generating a combustion gas by burning a mixture of a hydrocarbon fuel and an oxygen containing gas;
   a reaction zone having two or more points to introduce feedstock arranged therein for producing a carbon black containing flow by contacting said combustion gas with a feedstock introduced in a plurality of divided flows to thermally decompose or incompletely combust the feedstock; and
   a quench zone for stopping a carbon black growth reaction by injecting a coolant to said carbon black containing flow, wherein:
   the combustion, reaction, and quench zones are arrayed laterally in order,
   the combustion zone extending just to an upstream end of the reaction zone containing the feedstock introduction part, and
   the cross-section shape of the area from a first of the two or more points to a last of the two or more points in said reaction zone is not a circle nor a polygon,
   the cross-section shape is selected from the group consisting of a shape formed of a combination of semicircle or circle segments and elliptical segments, a shape formed of semicircle or circle segments and open curves, a shape formed of semicircles and straight lines, a shape formed of circle segments and straight lines, a shape formed of a combination of curved line and curved line, a shape formed of a combination of curved line and straight line, a shape of ellipse, and a shape formed of elliptical segments and straight lines, and
   a ratio of a longest axis of said cross-section shape to a shortest axis thereof is 1.5-20.

2. A carbon black reactor according to claim 1, wherein said cross-section shape is formed of a combination of curved line and curved line.

3. A carbon black reactor according to claim 1, wherein said cross-section shape is formed of a combination of curved line and straight line.

TABLE 3

Physical and chemical properties of Carbon black

|  | Example 1 | Example 2 | Comparative example 1 | Comparative example 2 | Reference example 1 |
|---|---|---|---|---|---|
| CTAB (m²/g) | 134 | 134 | 133 | 132 | 132 |
| CDBP (ml/100 g) | 128 | 111 | 124 | 109 | 130 |
| Dst (nm) | 70 | 62 | 68 | 63 | 71 |
| D50 (nm) | 47 | 39 | 56 | 51 | 47 |
| D50/Dst | 0.671 | 0.629 | 0.824 | 0.810 | 0.662 |

4. A carbon black reactor according to claim 1, wherein the ratio of a longest axis of said cross-section shape to a shortest axis thereof is 2-10.

5. A carbon black reactor according to claim 1, wherein said cross-section shape is a shape formed of a combination of semicircle or circle segments and elliptical segments.

6. A carbon black reactor according to claim 1, wherein said cross-section shape is a shape formed of semicircle or circle segments and open curves.

7. A carbon black reactor according to claim 1, wherein said cross-section shape is a shape formed of semicircles and straight lines.

8. A carbon black reactor according to claim 1, wherein said cross-section shape is a shape formed of circle segments and straight lines.

9. A carbon black reactor according to claim 1, wherein said cross-section shape is and a shape formed of elliptical segments and straight lines.

10. A carbon black reactor according to claim 1, wherein said cross-section shape is formed of the combination of two circle segments and two straight lines.

11. A carbon black reactor according to claim 1, wherein said cross-section shape is formed of the combination of two circle segments and two ellipse segments.

12. A carbon black reactor according to claim 1, wherein said cross-section shape is a shape of ellipse.

\* \* \* \* \*